United States Patent [19]

Hepworth

[11] Patent Number: 4,598,236
[45] Date of Patent: Jul. 1, 1986

[54] BACKGROUND RASTER GENERATOR

[75] Inventor: Mark N. Hepworth, Cedar Rapids, Iowa

[73] Assignee: Rockwell International Corporation, El Segundo, Calif.

[21] Appl. No.: 564,808

[22] Filed: Dec. 22, 1983

[51] Int. Cl.[4] .................. H01J 29/70; H04N 3/32; H04N 5/04
[52] U.S. Cl. .................. 315/403; 315/408; 358/137; 358/152
[58] Field of Search .............. 358/137, 152, 119, 140, 358/217; 315/403, 408

[56] References Cited

U.S. PATENT DOCUMENTS 4,490,653 12/1985 Olmstead ................. 315/403

Primary Examiner—Theodore M. Blum
Assistant Examiner—David Cain
Attorney, Agent, or Firm—Robert C. Mayes; George A. Montanye; H. Fredrick Hamann

[57] ABSTRACT

A raster generator circuit is disclosed for a cathode ray tube display having a fixed efficiency at any desired raster scan rate. eliminating external clock dependency for synchronization ahd having a fixed efficiency. The circuit generates a raster signal having a self-adjusting line density corresponding to the time allowed for rastering a complete screen.

5 Claims, 1 Drawing Figure

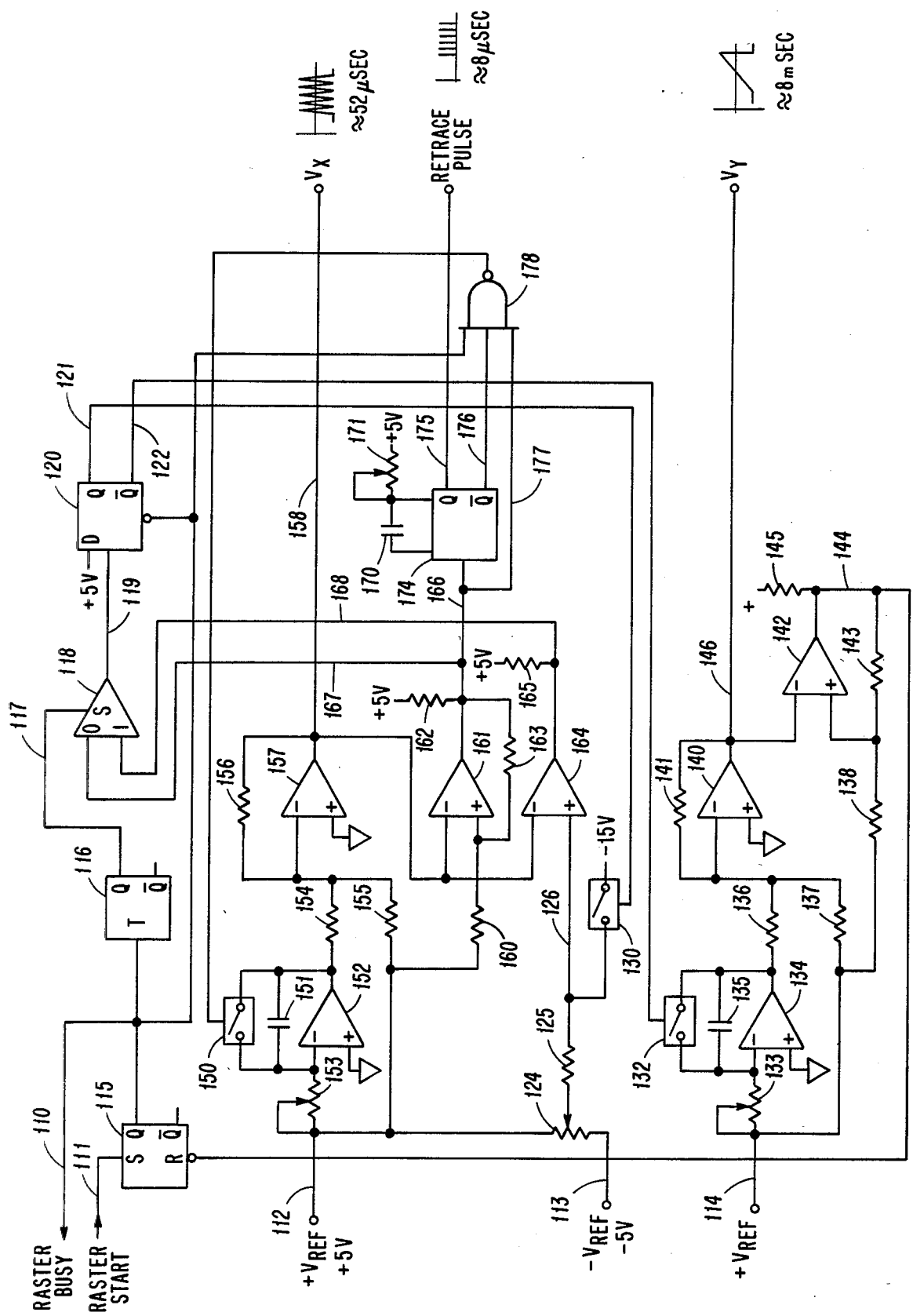

BACKGROUND RASTER GENERATOR

BACKGROUND OF THE INVENTION

This invention relates to cathode ray tube raster generator circuits in general and more specifically to a raster generator circuit independent of external clock requirements and having a self-adjusting line density.

Raster scanned cathode ray tubes (CRTs) generally require a synchronization signal to maintain a raster scan frequency synchronized with a modulated video signal input. In a number of special purpose applications, it is useful to vary the raster scan rate, thereby avoiding interference with other electronic circuits located in close proximity to the CRT, and to vary the amount of data represented on the display. In a typical apparatus, the X deflection signal is a sawtooth wave ramp with each tooth representing one side-to-side scan and the Y deflection input is likewise a sawtooth wave ramp having a lower frequency wherein the beam is swept repeatedly in the X axis, and the sweeping beam is gradually lowered or raised across the face of the display.

It is important that the raster sequence be started at the same time that the video modulating signal is input to the electron beam gun control to maintain an ascertainable video display. This typically requires an external clock, starting the X axis scan at the correct time relative to the Y deflection voltage.

One problem that has been noted is the varying efficiency of the electronics required in variable scan rate raster CRTs. The efficiency tends to be greater at relatively high scan rates and drops off as the scan rate is lowered. Additionally, when two or more CRTs are to be operated in an associated relationship, the requirement for an external clock requires an interconnect scheme and thus requires complex interconnection and coordination circuitry.

SUMMARY AND BRIEF DESCRIPTION

Accordingly, it is an object of the present invention to provide a raster scan generator circuit providing X and Y deflection signals independent of any external clock requirements and having a fixed efficiency for any raster scan rate.

Another object of the present invention is to provide a raster generator circuit capable of rastering a complete screen in response to a single raster start pulse and providing a variable width retrace pulse for the X axis control and providing an interlace capability to allow double line density when desired.

Briefly, and in accordance with the present invention, in a cathode ray tube control apparatus, a raster generator circuit comprises means for deflection control respectively in the X and Y axes of said display, means coupled to said means for deflection control for generating a variable width retrace pulse in the X axis, means coupled to the means for deflection control for interlace control thereby optionally allowing double line density, and means for independently generating a fully rastered screen in response to a singular start-raster pulse and coupled to the means for deflection control. The circuit described herein utilizes a ramp integrator for each of the X and Y axes, respectively, coupled together and coordinated with the associated circuit components to provide X and Y raster outputs which are fully coordinated without a requirement for external clock. Additionally, the interlace capability allows a double density line raster enabling an increased resolution with minimal increase in cost.

Other objects and advantages of the invention will become obvious upon reading the specification in conjunction with the drawing in which a detailed schematic circuit diagram of one embodiment of a raster generator circuit constructed in accordance with the present invention is shown.

DETAILED DESCRIPTION OF THE DRAWING

Referring now to the drawing, the schematic circuit diagram is essentially a self-contained raster generator having a raster start input 111, the +5 volt reference input 112 and 114 for the integrator circuits, and a −5 volt reference 113 used in conjunction with interlace capability in the display which will not be shown on the video screen. The outputs 158 (which is the X deflection) and 146 (which is the Y deflection) are designed for direct connection to the control circuitry of a cathode ray tube. The retrace pulse output 175 is additionally provided for X deflection amplifier retrace function (not shown).

While specific components are described with respect to this exemplary embodiment, it should be noted that various resistor substitutions as well as logic circuit components may be substituted in accordance with good engineering practice to perform essentially equivalent functions.

A raster start pulse is input on line 111 to the bistable flip-flop 115 (54LS00) both to indicate a raster busy output on line 110 and to start the screen raster interlace control flip-flop 116 (54LS74). The output of flip-flop 116 is provided to start the Y axis integrator function, triggering gate 118 operating as an a two input data selector (54LS51), dependent upon input to gate 118, triggering the flip-flop 120 to initiate the Y axis integration by resetting the Y integrator reset switch 132 (a MOSFET switch AH0015) coupled to the flip-flop 120 by line 122. The inverted output on line 121 of the flip-flop 120 is provided to the zero crossing detect inhibit switch 130, which is operable on alternate X deflection scans, to change the data selected from either comparator 161 or comparator 164 to the output of gate 118 at line 119.

The X reset control line output from NAND gate 178 resets the switch 150 (AH0015) for each X deflection scan. The timing for the X scan is controlled by the potentiometer 153 (23 kOhms) and the capacitor 151 (0.0012 µf) in combination with operational amplifier 152 (LF156). The output thereof is coupled through resistor 154 (20 kOhms) to the negative input of op amp 157 (LF156) having resistor 156 (20 kOhms) coupled from the negative input to the output thereof. The output of op amp 156 is provided as the X integrator output and is an input to comparator 161 (LM211) to provide an upper limit detection and as an input to comparator 164 for detecting the X axis zero crossing point, having an output thereof into gate 118 for interlace control. Resistors 162 and 165 as well as resistor 145 are 10 kOhms pull-up resistors for appropriate signal level matching. Resistor 160 (10 kOhms) is provided across the +5 volt reference 112 for comparison by comparator 161 to detect the X axis upper voltage limit. The zero crossing detection comparator 164 utilizes the adjustable voltage reference provided in combination with the −5 volt reference 113 and potentiometer 124 (20 kOhms) and the resistor 125 (10 kOhms) to detect a zero crossing of the X axis deflection signal, thereby changing the function of gate 118 for alternate sweeps of the X deflection signal. The X axis deflection busy output 166 from comparator 161 is input to multivibrator 174 having the active low output on line 176 into the NAND gate 178 and the active high output providing the retrace pulse output on line 175 for the X deflection amplified retrace control. The retrace pulse width is controlled by the combination of the potentiometer 171 and capacitor 170 to any desired width. The output 166 is also coupled to NAND gate 178 directly providing the X reset control upon detection of the X voltage upper limit to reset the X axis integrator switch 150 to restart the X integration.

Similarly, the Y axis integrator circuit operates on the active low output from flip-flop 120 to reset switch 132, and start the Y integration. The Y ramp time is controlled in combination by the setting of the potentiometer 133 (approximately 43 kOhms) and capacitor 135 (0.1 mf) coupled across the op amp 134 (LM1558) providing an output through resistor 136 (20 kOhms) into the negative input of the op amp 140, for relating the Y integrator output on line 146 to provide the deflection output for the CRT in the Y axis. Resistor 141 (20 kOhms) and resistor 137 (20 kOhms) additionally coupled to the +5 volt reference 114 provide a level shifing and scaling capability for the Y axis. The Y axis upper limit detection comparator 142 utilizes a connection through resistor 138 (10 kOhms) at its positive input and the output 146 from op amp 140 as the negative input to provide a Y axis deflection circuit BUSY output on line 144 to the reset connection of flip-flop 115, thereby effectively disabling the initiate raster function until such time as the Y ramp reaches its upper limit voltage, as detected by comparator 142.

Thus utilizing the circuit components as shown and described herein, the X deflection output is an approximate 52 ms sawtooth wave on line 158, in conjunction with an approximate 8 ms retrace pulse at the completion of each of the X ramp integrations, providing an approximate total of 60 μS for each of the X deflection signals. The Y deflection ramp will take approximately 8 milliseconds and is completely independent of any external clock requirement other than a single raster start pulse to initialize the circuit and begin the raster generation operation.

The total number of X raster lines is equal to the Y ramp time divided by the X ramp time plus retrace pulse width. Since both the X deflection time (which is governed by potentiometer 153) and the Y ramp time (governed by potentiometer 133) are adjustable, the number of lines is entirely adjustable.

Furthermore, since the gate 118 operates to provide the X axis interlace capability, the effective output is a double line density raster signal, variable in total number of X raster lines, to provide an increased resolution and completely independent of external clock requirements.

While the present invention has been described with respect to a specific exemplary embodiment, it can be seen that the circuit technique is not limited to this embodiment but may be adapted to a variety of applications. Since modifications to the foregoing description may occur to those skilled in the art which very well may not constitute a departure from the scope and spirit of the invention, the description is intended to be merely exemplary, and it is therefore contemplated that the appended claims will cover any such modifications of embodiments as fall within the true scope of the invention.

What is claimed is:

1. In a cathode ray tube display control apparatus, a raster generator circuit comprising:
   a. means for deflection control in the X and Y axes of said display, respectively;
   b. means coupled to said means for deflection control for generating a variable width retrace pulse in the X axis;
   c. means coupled to said means for deflection control, for interlace control thereby allowing double line density; and
   d. means for independently generating a fully rastered screen in response to a singular start-raster pulse, and coupled to said means for deflection control.

2. A circuit as in claim 1 wherein said means for independently generating a fully rastered screen comprises in combination a first reset switch in cooperation with said means for deflection control in the X axis, and a second reset switch in cooperation with said means for deflection control in the Y axis.

3. A circuit as in claim 2 wherein said means for deflection control in the X and Y axes comprises two adjustable rate integrators utilizing operational amplifiers, operational at separate frequencies, to provide X and Y deflection outputs for said cathode ray tube display, respectively.

4. A raster generator circuit for a cathode ray tube display comprising:
   a. a first adjustable rate integrator means for deflection control in the X axis of said cathode ray tube display;
   b. a second adjustable rate integrator means for deflection control in the Y axis of said display;
   c. logic control means coupled intermediate said first integrator means and said second integrator means for maintaining cooperation therebetween responsive to a singular start-raster pulse to generate a fully rastered screen; and
   d. means coupled to said logic control means for interlace control thereby allowing double-line density on said display.

5. A circuit as in claim 4 further comprising means coupled to said logic control means for generating a variable width retrace pulse in the X axis of said display.

* * * * *